United States Patent [19]

Goel et al.

[11] Patent Number: 4,614,786

[45] Date of Patent: Sep. 30, 1986

[54] STABLE ISOCYANATE/EPOXIDE PREPOLYMERS AND THERMOSET POLYURETHANES PRODUCED THEREFROM

[75] Inventors: Anil B. Goel, Worthington; Peggy A. Blackburn, Plain City; Timothy A. Tufts, Columbus, all of Ohio

[73] Assignee: Ashland Oil Inc., Ashland, Ky.

[21] Appl. No.: 764,284

[22] Filed: Aug. 12, 1985

[51] Int. Cl.[4] ............................................. C08G 18/58
[52] U.S. Cl. ........................................ 528/60; 528/65; 528/66; 528/73
[58] Field of Search ....................... 528/60, 65, 66, 73

[56] References Cited

U.S. PATENT DOCUMENTS

| | | | |
|---|---|---|---|
| 3,313,747 | 4/1967 | Schramm | 528/73 |
| 3,847,874 | 11/1974 | Murakami et al. | 528/45 |
| 4,022,721 | 5/1977 | Ashida | 528/73 |
| 4,386,191 | 5/1983 | DiSalvo et al. | 528/110 |

*Primary Examiner*—Maurice J. Welsh
*Attorney, Agent, or Firm*—John F. Jones

[57] ABSTRACT

A process for preparing a polyurethane by reaction of A, a prepolymer prepared by the low temperature reaction of a polyisocyanate and a polyepoxide, with B, a polyol, is described.

8 Claims, No Drawings

STABLE ISOCYANATE/EPOXIDE PREPOLYMERS AND THERMOSET POLYURETHANES PRODUCED THEREFROM

This invention relates to prepolymers containing both isocyanate and epoxide groups which have excellent shelf life and to thermoset polyurethane type materials which can be prepared from the prepolymers by their reaction with polyols usually in the presence of a catalyst. The prepolymers are prepared by the low temperature reaction of a polyisocyanate with a polyepoxide which contains few or no hydroxyl groups.

Reactions of polyisocyanates with polyepoxides in the presence of a suitable catalyst have been known to result in the formation of polymers which contain oxazolidone groups in the polymer backbone. Reactions of polyisocyanates or a polyisocyanate prepolymer with a mixture of hydroxy and epoxy group containing material to produce poly (oxazolidone-urethane) thermoset polymers have been described in U.S. Pat. Nos. 3,847,874 and 4,386,191; Japanese Pat. No. 59,179; European Pat. No. 129787-A and West German Patent Publication No. 3,323,123.

U.S. Pat. No. 3,847,874 describes the formation of polymers containing oxazolidone and urethane linkages by reaction of a polyisocyanate with a prepolymer formed by a two-step reaction involving (1) reaction of a dicarboxylic acid or anhydride and saturated dihydric alcohol followed by (2) reaction with a diepoxide. Modification of this is described in U.S. Pat. No. 4,386,191 which relates to a single step process for forming epoxy and hydroxy group containing prepolymers and thermoset polymers therefrom by reacting the prepolymers with polyisocyanates. The West German Patent Publication No. 3,323,123 describes the formation of thermoset polymer with high mechanical and heat deformation properties from the reaction of a polyisocyanate with a mixture of polyol and polyepoxide in the presence of catalyst such as boron trichloride with benzyl dimethyl amine.

We have discovered that the use of a polyisocyanate prepolymer prepared from the low temperature reaction of a polyisocyanate, such as methylene bis (phenyl isocyanate) with a polyepoxide containing no or very low levels of hydroxyl groups (less than 20% weight based on the epoxy groups present) which has a long shelf stability, in the poly (oxazolidone/urethane) thermoset polymer synthesis by reacting said prepolymer with polyols in the presence of a catalyst which promotes the formation of urethane/isocyanurate/oxazolidone groupings.

The most suitable epoxy materials, for use in the resin systems of the invention are resins having an epoxide equivalent number of 2.0 or greater. Included are bisphenol A-based epoxy resins such as bisphenol-A diglycidyl ether, bisphenol-F diglycidyl ether, aliphatic epoxides, cycloaliphatic epoxides, epoxy novalak and heterocyclic-type epoxy resins. These should, as previously noted, be substantially free of hydroxyl groups.

Polyols useful in the preparation of the thermoset polymers of this invention include those having at least two hydroxyl groups per molecule and having equivalent weights falling in the range of from 20 to 5000. Specific polyols include butane diol, cyclohexane dimethanol, tripropylene glycol, amide diols, urethane diols, polyether polyols such as poly (tetramethylene ether) diols, poly (propylene ether) polyols, polyester polyols, and the like.

Polyhydroxy polyethers are suitable. Polyhydroxy polyethers can be prepared by polymerization of epoxides such as ethylene oxide, propylene oxide, butylene oxide, tetrahydrofuran, styrene oxide, or epichlorohydrin either on their own or by chemical addition to other materials. Suitable other materials include ethylene glycol, propylene glycol, trimethylol propranes and 4,4'-dihydroxy diphenyl propane. Sucrose polyethers also may be used. Polybutadienes having hydroxyl groups as well as other known hydroxyl containing vinyl addition polymerized polymers can be used.

According to the present invention, hydroxyl containing polyesters, polythioethers, polyacetals, polycarbonates or polyesteramides of the types known for the formation of polyurethanes may also be used.

Particularly useful polyols for the present invention include the following representative aliphatic and aromatic polyhydric alcohols. Ethylene glycol, propylene glycol, trimethylene glycol, triethylene glycol, pentaethylene glycol, polyethylene glycol, 1,4-butanediol, diethylene glycol, dipropylene glycol, 2,2-dimethyl-1,3-propanediol, hexamethylene glycol, 1,4,cyclohexane dimethanol, xylene alcohols, ethyl resorcinol, propyl resorcinol, 2,4-dimethyl resorcinol, 3,6-dimethyl-1,2-dihydroxy naphthalene, 3-methyl-1,4,5-naphthalene triol, dimethylol toluene, dimethylol xylene, bis-hydroxyethyl or bis-hydroxypropyl ethers of resorcinol, catechol and hydroquinone, 1,5-dihydroxy naphthalene, 4,4'-isopropylidene-bis-phenol, and the like.

The polyisocyanates useful in the preparation of the prepolymers of this invention include organic isocyanates having at least two isocyanate groups per molecule. The polyisocyanates can be of low, high or intermediate molecular weight and can be any of a wide variety of organic polyisocyanates including ethylene diisocyanate, trimethylene diisocyanate, dodecamethylene diisocyanate, hexamethylene diisocyanate, hexamethylene diisocyanate trimer, tetraethylene diisocyanate, pentamethylene diisocyanate, propylene-1,2-diisocyanate, 2,3-dimethyl tetramethylene diisocyanate, butylene-1,2-diisocyanate, butylene-1,3-diisocyanate, 1,4-diisocyanate cyclohexane, cyclopentene-1,3-diisocyanate, p-phenylene diisocyanate, 1-methyl phenylene-2,4-diisocyanate, naththalene-1,4-diisocyanate, toluene diisocyanate, diphenyl-4,4'-diisocyanate, benzene-1,2,4-triisocyanate, xylene-1,4-diisocyanate, xylene-1,3-diisocyanate, 4,4'diphenylene methane diisocyanate, 4,4'-diphenylene propane diisocyanate, 1,2,3,4-tetraisocyanate butane, butane-1,2,3-triisocyanate, polymethylene polyphenyl isocyanate, and other polyisocyanates having an isocyanate functionality of at least two more fully disclosed in U.S. Pat. Nos. 3,350,362 and 3,382,215. Polyisocyanates which are polymeric in nature including isocyanate prepolymers of all types are included in this invention.

Thus, it has been found that polyisocyanate prepolymers obtained from the reaction of di-or polyisocyanates with polyepoxides having no or low levels of hydroxy functionality at temperatures below about 100 degrees C. in the absence of any catalyst contain both isocyanate and epoxide groups and these liquid prepolymers have long shelf stability. To illustrate, when a mixture of 80–90% polyisocyanate (liquid methylene bis-phenyl isocyanate having an isocyanate equivalent weight of 144) and 10–20% of a liquid diglycidyl ether of Bisphenol-A (epoxy equivalent weight of 180–190) is heated at about 60 degrees C. for about 3 hours, a liquid prepolymer is formed which has a shelf stability at room temperature of more than 2 months. This prepolymer, upon reaction with a polyol which contains a tertiary amine and cationic complex catalyst, results in the formation of a thermoset polymer which contains urethane, isocyanurate and oxazolidone linkages. Isocyanurate and oxazolidone groups in the polymer are believed to impart high heat deformation and thermal stability properties and the urethane linkages are believed to provide the toughness and flexibility to the polymer. In order to improve the impact strength of the thermoset polymer it is advantageous to add to the polymerization mixture soft segments such as a synthetic rubber.

The equivalent ratio of isocyanate to epoxy groups in the polyisocyanate-epoxy prepolymer compositions may be in the range of from 1:0.001 to 1:1 and preferably from 1:0.05 to 1:0.5. The reaction of polyisocyanate and polyepoxide to form a prepolymer can be carried out at temperatures in the range of from about room temperature to about 100 degrees C. The equivalent ratio of isocyanate to combined epoxy and hydroxyl groups may be in the range of from 0.8:1 to 3:1. The suitable catalysts for the thermoset polymer formation include cationic catalysts, tetraalkyl ammonium salts, tertiary amines, titanium alkoxides, alkali and alkaline earth metal salts, boron trihalide-tertiary amine adducts, organotin compounds, and others known to those skilled in the art.

The prepolymers and the thermoset polymers of this invention can contain the usual fillers, pigments, and the like which are well known to those skilled in the art.

The polymerization temperature used in the preparation of the thermoset polymers of this invention can range from about room temperature to about 200 degrees C.

This invention is further illustrated in the following representative examples.

EXAMPLE 1

The polyisocyanate-polyepoxy prepolymers were prepared by reacting either the polyisocyanate with polyepoxide or reacting a polyisocyanate prepolymer prepared from the polyisocyanate reaction with high molecular weight polyol or polybutadiene rubber (hydroxy or carboxylic acid terminated). The procedures used are described in more detail below.

A. Liquid methylene bis (phenyl isocyanate) (700 g) and 70 g of carboxylic acid terminated polybutadiene rubber (Hycar 1300 x 8 from BF Goodrich Co.) were mixed and heated at 96 to 100 degrees C. for about 3 hours to give the polyisocyanate prepolymer.

B. Liquid methylene bis (phenyl isocyanate) (700 g) and 70 g of carboxylic acid terminated polybutadiene rubber were mixed and heated at 95 to 100 degrees C. for 3 hours. The mixture was then brought to about 80 degrees C. and to this was added 77 g of liquid diglycidyl ether of Bisphenol-A(DGEBA) (equivalent weight of 180-188, Epon 826 from Shell Chemical Co.). The resulting mixture was heated for 1 hour at 80 degrees C. to give a prepolymer containing epoxy and isocyanate groups.

C. The procedure of B was followed using 700 g of liquid diisocyanate, 70 g of the polybutadiene rubber and 77 g of liquid DGEBA (equivalent weight of 185-192, Epon 828 from Shell Chemical Co.) to give the liquid prepolymer which contained both isocyanate and epoxide groups.

D. The procedure of A was followed using 400 g of the diisocyanate and 40 g of poly BD 45 MT (hydroxy terminated polybutadiene from Arco Chemical Co.) to give a clear solution of polyisocyanate prepolymer.

E. The procedure of B was followed using 400 g of the liquid diisocyanate, 40 g of poly BD 45 MT and 44 g of liquid DGEBA (Epon 826) to give the liquid prepolymer which contained both isocyanate and epoxide groups.

F. Liquid methylene bis (phenyl isocyanate) (300 g) and 53 g of liquid DGEBA (Epon 826) were mixed and heated at 80 degrees C. for 1 hour. The resulting clear polyisocyanate prepolymer was kept at room temperature for approximately 2 months during which time no significant change in the viscosity was noticed and the solution remained liquid without any gelation. This material contained both isocyanate and epoxy groups.

EXAMPLE 2

A mixture of 15.0 g of dipropylene glycol (DPG), 3.5 g of trimethylol propane (TMP), 1.8 g of a bicyclic amide acetal having the formula

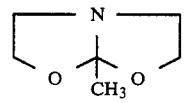

(moisture scavenger) and 0.6 g of methyl trioctyl ammonium chloride (catalyst) was degassed on a rotary evaporator under reduced pressure and was mixed with 65 g of the degassed polisocyanate/epoxy prepolymer of Example 1 B. The resulting mixture was poured into a mold prepared by two silicone mold release coated parallel glass plates held apart by ⅛ inch thickness spacers. The mold was placed in an oven at 60 degrees C. and the temperature of the oven was gradually increased to 130 degrees C. over a 2 hour period. The resulting polymer sheet was further postcured at 100 degrees C. for 1 hour. The solid polymer which resulted was found to have a notched izod impat strength (ASTM-D256) of 1.3 foot pounds/inch of notch, an unnotched izod impact strength of 10.3 foot pounds/inch, a heat distortion temperature (ASTM-D648) of 118 degrees C., a yield strength (ASTM-D790) of 17,762 psi and a flexural modulus of 361,193 psi. The Tg by DSC (differential scanning calorimetry) was 132.5 degrees C. and 10% weight loss by thermal gravimetric analysis (TGA) in nitrogen occurred at 311 degrees C.

EXAMPLE 3

This example, which is outside the scope of this invention, is for comparison purposes. No epoxy resin was used in the process.

The procedure of Example 2 was followed using a mixture of 35.1 g of DPG, 8.1 g of TMP, 0.7 g of the bicyclic amide acetal and allowing this mixture to react with 134 g of the polyisocyanate prepolymer of Example 1 A. The postcured polymer was found to have a notched izod impact strength of 0.3 foot pounds/inch of notch, an unnotched izod impact strength of 0.5 foot pounds/inch and a heat distortion temperature of 80 degrees C.

EXAMPLE 4

The procedure of Example 2 was followed using 22.9 g of DPG, 5.4 g of TMP, 0.83 g of the catalyst and 100 g of the polyisocyanate/epoxy prepolymer of Example 1 C. The resulting polymer was found to have a notched izod impact strength of 1.1 foot pounds/inch of notch and a heat distortion temperature of 114 degrees C.

EXAMPLE 5

The procedure of Example 2 was followed using 30.8 g of DPG, 0.83 g of catalyst and 100 g of the prepolymer of Example 1C. The resulting polymer was found to have a notched izod impact strength of 1.4 foot pounds/inch of notch, an unnotched izod impact strength of greater than 14 foot pounds/inch and a heat distortion temperature of 101 degrees C.

EXAMPLE 6

The procedure of Example 2 was followed except that no catalyst was used. The reaction charge was 22.9 g of DPG, 5.4 g of TMP, and 100 g of the prepolymer of Example 1 C. The resulting polymer was found to have a notched izod impact strength of 1.2 foot pounds/inch of notch and a heat distortion temperature of 80 degrees C. This indicates that when the oxazolidone/isocyanurate catalyst is not used a somewhat inferior product results (compare with Example 4).

EXAMPLE 7

The procedure of Example 2 was followed using 17.4 g of DPG, 3.6 g of TMP, 0.5 g of bicyclic amide acetal, 0.6 g of the catalyst and 75 g of the epoxy/isocyanate prepolymer of Example 1 E. The resulting polymer was found to have a notched izod impact strength of 0.6 foot pounds/inch of notch, an unnotched izod impact strength of 10.2 foot pounds/inch, a heat distortion temperature of 110 degrees C. a tensile yield strength of 18,282 psi and a flexural strength of 365,656 psi.

EXAMPLE 8

The procedure of Example 7 was repeated except that no catalyst was used. The resulting polymer was found to have a notched izod impact strength of 0.5 foot pounds/inch of notch, an unnotched izod impact strength of 8.0 foot pounds/inch, and a heat distortion temperature of 84 degrees C.

EXAMPLE 9

This example is for comparison purposes and is outside the scope of the present invention. The procedure of Example 2 was followed using the charge ratio similar to that of Example 7 except that the prepolymer used contained no epoxy groups. The reaction charge was 21.5 g of DPG, 4.5 g of TMP, 1.0 g of bicyclic amide acetal and 82.5 g of the isocyanate propolymer of Example 1 D. The resulting polymer was found to have a notched izod impact strength of 0.5 foot pounds/inch of notch and a heat distortion temperature of 76 degrees C.

EXAMPLE 10

The procedure of Example 2 was followed using 26.4 g of DPG, 6.1 g of TMP, 1.0 g of the bicyclic amide acetal, 7.5 g of the carboxylic aciterminated Hycar rubber, 0.9 g of catalyst and 100 g of the isocyanate/epoxy prepolymer of Example 1 F. The resulting polymer was found to have a notched izod impact strength of 1.0 foot pounds/inch of notch and a heat distortion temperature of 108 degrees C.

EXAMPLE 11

The procedure of Example 2 was followed using 14.5 g of DPG, 8 g of propylene glycol, 12 g of grafted poly (styrene/acrylonitrile) polyol (Niax 34-28,2000 equivalent weight triol from Union Carbide Co.), and 90 g of the isocyanate/epoxy prepolymer of Example 1 F. The resulting polymer was found to have a notched izod impact strength of 0.9 foot pounds/inch of notch, an unnotched izod impact strength of 13 foot pounds/inch, a heat distortion temperature of 100 degrees C., a yield strength of 18,053 psi and a flexural modulus of 374,173 psi.

EXAMPLE 12

The procedure of Example 2 was followed using 24.3 g of DPG, 5.4 g of TMP, 0.85 g of catalyst and 100 g of the isocyanate/epoxy prepolymer of Example 1 F. The resulting polymer was found to have a notched izod impact strength of 0.6 foot pounds/inch of notch and a heat distortion temperature of 107 degrees C.

EXAMPLE 13

The degassed solution of 34.5 g of DPG, 8.1 g of TMP, 1.0 g of the bicyclic amide acetal and 1.3 g of the catalyst of Example 2 was mixed with 150 g of the degassed isocyanate/epoxy prepolymer of Example 1 B. The resulting mixture was injected onto a glass mat placed in a mold prepared by two parallel Teflon plates held apart by ⅛ inch spacers. The mold was placed in an oven at 100 degrees C. for one hour, followed by 120 degrees C. for another hour. The resulting glass reinforced (27% glass) polymer was found to have a notched izod impact strength of 7.6 foot pounds/inch of notch, a yield strength of 29,245 psi and a flexural modulus of 823,725 psi.

We claim:

1. The process for preparing a polyurethane comprising reacting
   A. A prepolymer prepared by the low temperature reaction of a polyisocyanate and a polyepoxide containing no or very low levels of hydroxyl groups in the absence of any catalyst with
   B. A polyol.
2. The process of claim 1 in which A is carried out at a temperature in the range of from about room temperature to about 100° C.
3. The process of claim 2 wherein the polyepoxide contains less than 20% by weight of hydroxyl groups based on the weight of epoxy groups.
4. The process of claim 3 wherein the equivalent ratio of isocyanate to epoxy groups in the prepolymer of A is in the range of from 1:0.001 to 1.1.
5. The process of claim 3 wherein the equivalent ratio of isocyanate to combined epoxy and hydroxy groups is in the range of from 0.8:1 to 3:1.
6. The process of claim 1 A and B carried out at a temperature in the range of from about room temperature to about 200° C.
7. The process of claim 5 wherein the polyisocyanate is methylene bis(phenyl isocyanate), the polyepoxide is the diglycidyl ether of bisphenol-A, and the polyol is a mixture of dipropylene glycol and trimethylol propane.
8. The polymer prepared according to the process of claim 1.

* * * * *